J. F. STARBUCK.
VEHICLE WHEEL.
APPLICATION FILED APR. 24, 1912.

1,053,889.

Patented Feb. 18, 1913.

WITNESSES
L. Rouville,
O. F. Nagle.

INVENTOR
Joseph Frank Starbuck.
BY Wiedersheim & Fairbanks.
ATTORNEYS

UNITED STATES PATENT OFFICE.

JOSEPH FRANK STARBUCK, OF PHILADELPHIA, PENNSYLVANIA.

VEHICLE-WHEEL.

1,053,889.

Specification of Letters Patent. Patented Feb. 18, 1913.

Application filed April 24, 1912. Serial No. 692,907.

*To all whom it may concern:*

Be it known that I, JOSEPH FRANK STARBUCK, a citizen of the United States, residing in the city and county of Philadelphia, State of Pennsylvania, have invented a new and useful Vehicle-Wheel, of which the following is a specification.

My invention consists of an improved vehicle wheel provided with spring-spokes which consist of flat strips of spring metal connected to the rim and hub of the wheel and curved under tension to provide resiliency.

It further consists of such a wheel in which such curved spokes are additionally supported by auxiliary springs.

It further consists of such a wheel in which such auxiliary springs are brought into full service to support the load upon the wheel jointly with the primary spokes or springs when a predetermined load is imposed.

It further consists of other novel features of construction, all as will be hereinafter fully set forth.

The annexed drawings and the following description set forth in detail one mechanical form embodying the invention, such detail construction being but one of the various mechanical forms in which the principle of the invention may be used.

Figure 1:
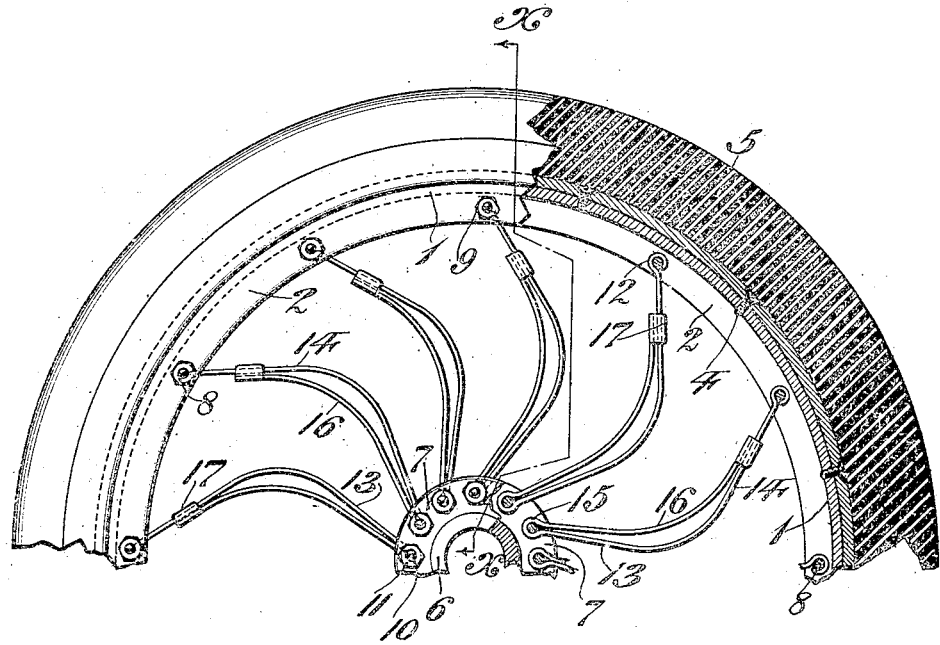
Figure 2:
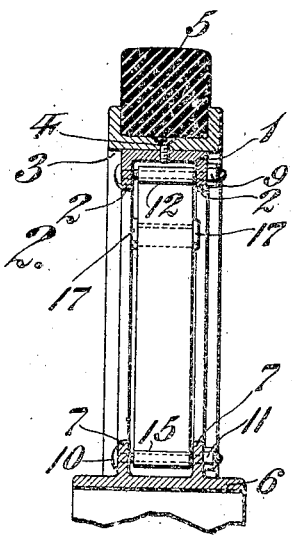
Figure 3:
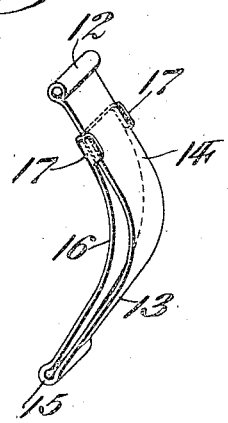

In said annexed drawings—Figure 1 represents a side-view, partly in section, of one half of my improved vehicle wheel. Fig. 2 represents a transverse section on the line x—x in Fig. 1. Fig. 3 represents a perspective view of one of the spring spokes.

Similar numerals of reference indicate corresponding parts in the figures.

Referring to the drawings, the reference numeral 1 indicates an annular felly, preferably of metal, and formed with two inwardly-projecting flanges, 2. A rectangularly trough-shaped rim, 3, is secured to the outer side of said felly, by means of bolts, 4, and a tire, 5, of rubber or any suitable or desired material, is secured in the trough of such rim. A hub, 6, is formed with a pair of annular circumferential flanges, 7. Bolts, 8, are inserted at proper intervals through the flanges of the felly, and may be secured therein by nuts, 9, or by other suitable fastening means, and bolts, 10, are inserted through the flanges of the hub to radially aline with the bolts in the felly, and may be secured in such flanges by nuts, 11, or by other suitable fastening means. Each spring-spoke is formed from a strip of spring-metal having one end doubled back to form a cylindrical eye, 12, to fit and turn upon one of the bolts in the felly. The spring-strip is curved to have its inner and outer portions, 13 and 14, stand at about an angle of 120°, and at the inner end of the spoke the strip is doubled upon itself to form a cylindrical eye, 15, to fit upon a bolt in the flanges of the hub in radial alinement with the bolt in the felly upon which the outer eye of the spoke is secured. The doubled portion of the strip which forms an auxiliary spring, 16, is curved on a flatter curve than the main-spring and has its outer end in loose and slidable contact with the outer portion 14 of the main spring, and said outer end has two lips, 17, upon its side-edges to embrace the main spring and prevent lateral displacement of the two spring-portions of the spoke.

The main springs of the wheel will absorb the shocks to the wheel when traveling over the ground under light or normal load. As the load increases, a part of the strain of compression will be transmitted to the auxiliary springs, and under still increasing load, the ends of the auxiliary springs will eventually bear against the eyes of the main or primary springs in the felly, when the load will be borne by both sets of springs. In this manner, the wheel will be freely resilient under light or normal load and the resiliency of the wheel will automatically adjust itself according to the load imposed upon it. When the wheel is employed for a vehicle normally intended for light loads, the ends of the auxiliary springs will be at a greater distance from the felly than in a wheel intended for a vehicle carrying heavy loads.

The wheel is simple and inexpensive of construction and a broken spoke may easily be replaced by removing its two bolts, removing the broken spoke, and replacing the new spoke and the bolts without disturbing the integrity of the wheel. The pneumatic tire with its drawbacks of wear, puncture and other damages liable to occur, is dispensed with in this wheel construction.

Other modes of applying the principle of my invention may be employed for the mode herein explained. Change may therefore be made as regards the mechanism thus disclosed, provided the principles of construction set forth, respectively, in the following claims are employed.

Having thus described my invention, what I claim as new and desire to secure by Letters Patent, is:—

1. In a vehicle wheel, a spring-spoke formed from a flat strip of spring-metal having one end formed with means for securing it to a wheel-felly, having a curved main spring portion, and doubled upon itself to form an eye and an auxiliary spring-portion curved on a flatter curve than said main-portion and having its free end only bearing against the concave side of the main spring-portion and slidable upon the same.

2. In a vehicle wheel, a spring-spoke formed from a flat strip of spring-metal having one end formed with means for securing it to a wheel-felly, having a curved main spring-portion, and doubled upon itself to form an eye and an auxiliary spring-portion curved on a flatter curve than said main-portion and having its free end bearing against the concave side of the main spring-portion and formed with lips on its sides embracing the main spring-portion and slidable upon the same.

3. A vehicle wheel, comprising a felly, a flanged hub, transverse bolts upon the inner side of said felly, bolts inserted through the flanges of the hub, and spring-spokes formed from a strip of spring-metal having one end bent into an eye to fit on a bolt in the felly and a curved main spring-portion and doubled upon itself to form an eye to fit upon a bolt in the hub and an auxiliary spring-portion curved on a flatter curve than said main-portion and having its free end only bearing against the concave side of the main portion and slidable upon the same.

4. A vehicle wheel, comprising a felly, a flanged hub, transverse bolts upon the inner side of said felly, bolts inserted through the flanges of the hub, and spring-spokes each formed from a strip of spring-metal having one end bent into an eye to fit on a bolt in the felly and a curved main spring-portion and doubled upon itself to form an eye to fit upon a bolt in the hub and an auxiliary spring-portion curved on a flatter curve than said main-portion and having its free end bearing against the concave side of the main portion and formed with lips on its sides embracing the main spring-portion and slidable upon the same.

5. A vehicle wheel, comprising a felly having inwardly projecting side-flanges, a flanged hub, bolts passed through the flanges of the felly, bolts inserted through the flanges of the hub and in radial alinement with the bolts in the felly, and spring-spokes each formed from a strip of spring-metal having one end bent into an eye to fit on a bolt in the felly and a curved main spring-portion and doubled upon itself to form an eye to fit upon a bolt in the hub and an auxiliary spring-portion curved on a flatter curve than said main-portion and having its free end bearing against the concave side of the main portion and slidable upon the same.

6. A vehicle wheel, comprising a felly having inwardly projecting side-flanges, a flanged hub, bolts passed through the flanges of the felly, bolts inserted through the flanges of the hub and in radial alinement with the bolts in the felly, and spring-spokes each formed from a strip of spring-metal having one end bent into an eye to fit on a bolt in the felly and a curved main spring-portion and doubled upon itself to form an eye to fit upon a bolt in the hub and an auxiliary spring-portion curved on a flatter curve than said main-portion and having its free end bearing against the concave side of the main portion and formed with lips on its sides embracing the main spring-portion and slidable upon the same.

JOSEPH FRANK STARBUCK.

Witnesses:
C. D. McVay,
N. Bussinger.